(12) United States Patent
Robbin et al.

(10) Patent No.: US 9,626,720 B2
(45) Date of Patent: Apr. 18, 2017

(54) LINKED USER ACCOUNTS

(71) Applicant: Apple Inc., Cupertino, CA (US)

(72) Inventors: Jeffrey L. Robbin, Los Altos, CA (US);
Eduardo Humburto Cue, Los Altos Hills, CA (US); Evan C. Krasts, Burlingame, CA (US); Andrew Irvin Williams, Mountain View, CA (US); Maria Ioveva, Menlo Park, CA (US); Patrice Olivier Gautier, San Francisco, CA (US); Steve S. Gedikian, Redwood City, CA (US); Usama Mikael Hajj, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 535 days.

(21) Appl. No.: 14/089,691

(22) Filed: Nov. 25, 2013

(65) Prior Publication Data

US 2015/0149358 A1   May 28, 2015

(51) Int. Cl.
*G06F 21/10* (2013.01)
*G06Q 40/02* (2012.01)
(Continued)

(52) U.S. Cl.
CPC ............. *G06Q 40/02* (2013.01); *G06F 21/10* (2013.01); *G06Q 20/1235* (2013.01);
(Continued)

(58) Field of Classification Search
CPC ...................................................... G06F 21/10
(Continued)

(56) References Cited

U.S. PATENT DOCUMENTS 6,609,113 B1   8/2003   O'Leary et al.
7,058,708 B2   6/2006   Gold et al.
(Continued)

FOREIGN PATENT DOCUMENTS

TW   200707229   2/2007
TW   200928747   7/2009
(Continued)

OTHER PUBLICATIONS

Jones, Hollin; "How to use Home Sharing in iTunes 9" www.techradar.com, Jan. 2, 2010.*
(Continued)

*Primary Examiner* — Lindsay M Maguire
(74) *Attorney, Agent, or Firm* — Polsinelli LLP

(57) ABSTRACT

Separate user accounts can be linked into a group of linked user accounts so that content items assigned to each of the user accounts can be accessed by each user account in the group. Linking user accounts in this way allows the individual user accounts to share content items while also retaining their individual properties such as username, password, preference data, etc. Linking user accounts allows each user account to retain the content items assigned to the user account when the user account is unlinked from the group. Linking user accounts can be restricted according to linking rules that dictate how many user accounts can be included in a group, when a user account can be added or removed from a group, etc. A master user account can set parameters restricting content items accessible to the user accounts in the group, as well as money spent be each user account.

27 Claims, 9 Drawing Sheets

(51) Int. Cl.
  *G06Q 50/00* (2012.01)
  *G06Q 20/40* (2012.01)
  *G06Q 20/12* (2012.01)
  *G06Q 20/34* (2012.01)
  *G06Q 30/06* (2012.01)

(52) U.S. Cl.
  CPC ......... *G06Q 20/3578* (2013.01); *G06Q 20/40* (2013.01); *G06Q 20/405* (2013.01); *G06Q 30/0601* (2013.01); *G06Q 50/01* (2013.01)

(58) Field of Classification Search
  USPC .......................................................... 705/51
  See application file for complete search history.

(56) References Cited

U.S. PATENT DOCUMENTS

| | | |
|---|---|---|
| 7,433,710 B2 | 10/2008 | Bodnar et al. |
| 7,493,374 B2 | 2/2009 | Cross et al. |
| 7,774,010 B2 | 8/2010 | Kokkonen et al. |
| 7,827,247 B1 | 11/2010 | Spertus et al. |
| 8,332,314 B2 | 12/2012 | Griffin |
| 8,459,544 B2 | 6/2013 | Casey et al. |
| 8,478,734 B2 | 7/2013 | Niejaklik |
| 8,588,749 B1 | 11/2013 | Sadhvani et al. |
| 8,630,885 B2 | 1/2014 | Klausmeier |
| 8,634,807 B2 | 1/2014 | Kermoian et al. |
| 8,662,384 B2 | 3/2014 | Dodin |
| 8,699,998 B2 | 4/2014 | Sprigg et al. |
| 2002/0049806 A1 | 4/2002 | Gatz et al. |
| 2003/0208442 A1 | 11/2003 | Cockrill et al. |
| 2008/0134295 A1 | 6/2008 | Bailey et al. |
| 2008/0140569 A1 | 6/2008 | Handel |
| 2009/0178132 A1 | 7/2009 | Hudis et al. |
| 2011/0047629 A1 | 2/2011 | Mitchell et al. |
| 2011/0191209 A1 | 8/2011 | Gould et al. |
| 2012/0173356 A1 | 7/2012 | Fan et al. |
| 2012/0226780 A1 | 9/2012 | Knight et al. |
| 2012/0278233 A1 | 11/2012 | Webber et al. |
| 2012/0324504 A1 | 12/2012 | Archer et al. |
| 2013/0073654 A1 | 3/2013 | Cohen et al. |
| 2013/0082819 A1 | 4/2013 | Cotterill |
| 2013/0104246 A1 | 4/2013 | Bear et al. |
| 2013/0110716 A1 | 5/2013 | Rekhi et al. |
| 2013/0110720 A1 | 5/2013 | Rekhi et al. |
| 2013/0260721 A1 | 10/2013 | Carney et al. |
| 2014/0044258 A1 | 2/2014 | Grewal et al. |
| 2014/0150068 A1 | 5/2014 | Janzer |
| 2015/0242611 A1 | 8/2015 | Cotterill et al. |

FOREIGN PATENT DOCUMENTS

| | | |
|---|---|---|
| TW | 201308237 | 2/2013 |
| TW | 201332332 | 8/2013 |
| WO | 2010/035281 | 4/2010 |
| WO | 2013/091068 | 6/2013 |

OTHER PUBLICATIONS

International Search Report and Written Opinion from PCT Application No. PCT/2014/066958 dated Feb. 20, 2015.
International Search Report and Written Opinion from PCT Application No. PCT/2015/029478 dated Jul. 20, 2015.
International Preliminary Report on Patentability from PCT Application No. PCT/US2014/066958 mailed Jun. 9, 2016.

* cited by examiner

FIG. 2A

| Account Identifier | Content Item Identifier | Linked Accounts |
|---|---|---|
| 1 | 11, 12 | |
| 2 | 13 | |
| 3 | 14, 15, 16 | |

205 → (row 1), 210 → (row 2), 215 → (row 3)

FIG. 2B

| Account Identifier | Content Item Identifier | Linked Accounts |
|---|---|---|
| 1 | 11, 12 | 2, 3 |
| 2 | 13 | 1, 3 |
| 3 | 14, 15, 16 | 1, 2 |

205 → (row 1), 210 → (row 2), 215 → (row 3)

FIG. 2C

| Account Identifier | Content Item Identifier | Linked Accounts |
|---|---|---|
| 1 | 11, 12 | |
| 2 | 13 | 3 |
| 3 | 14, 15, 16 | 2 |

205 → (row 1), 210 → (row 2), 215 → (row 3)

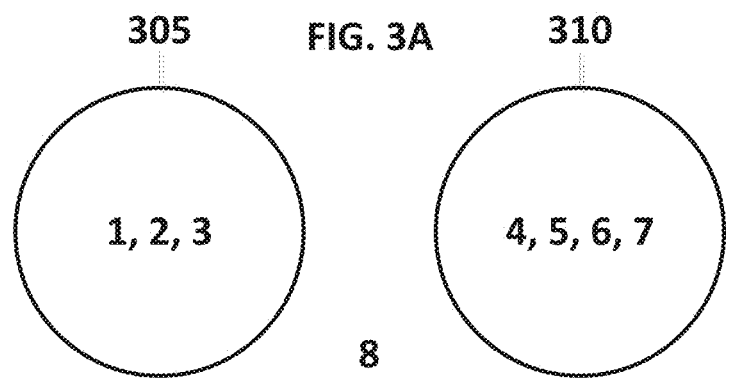
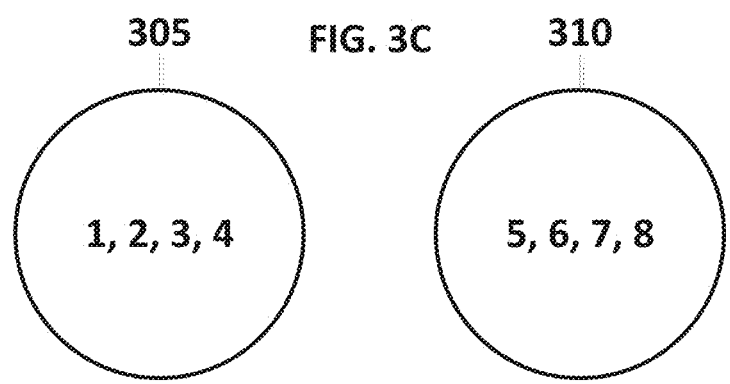

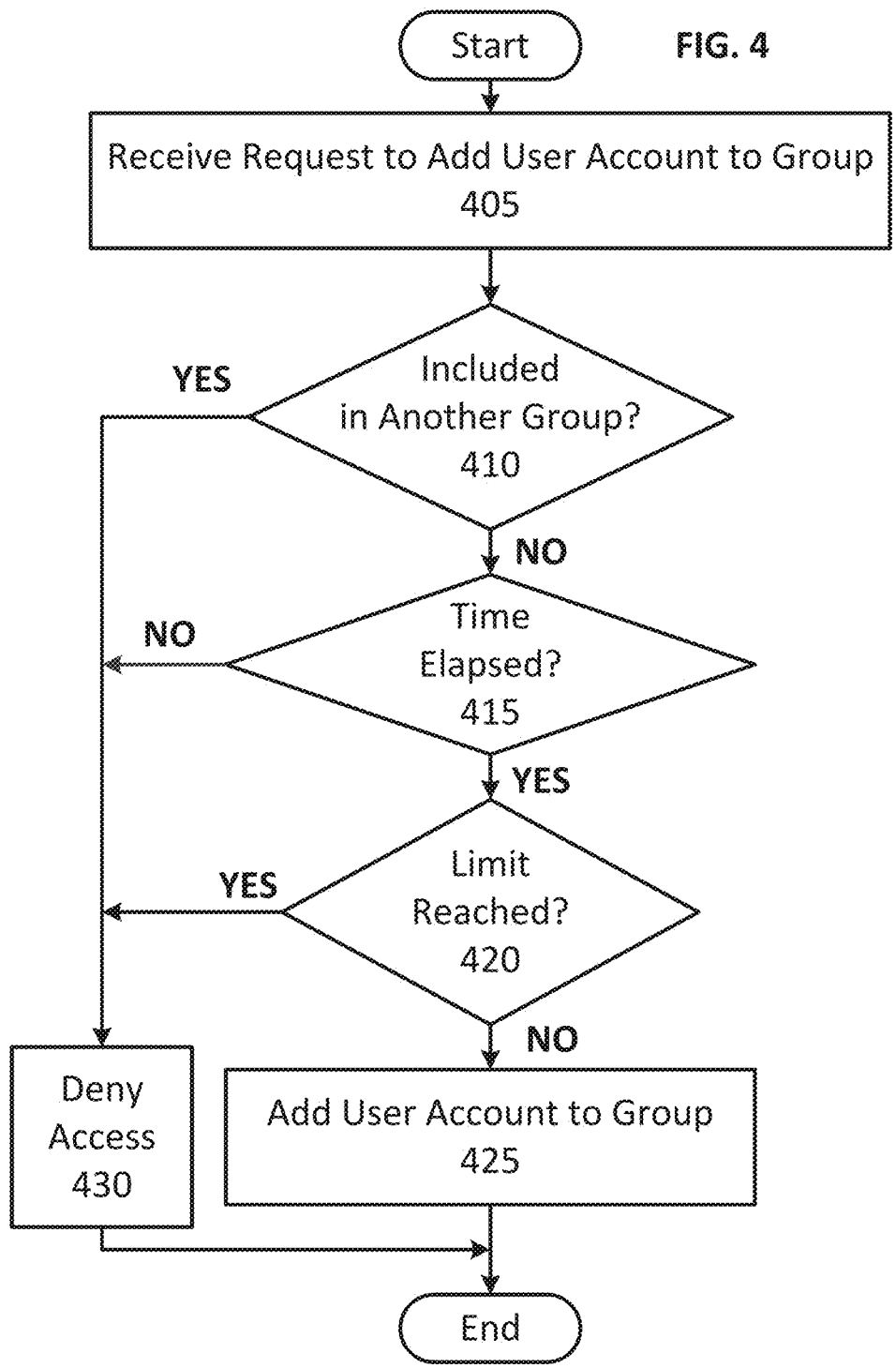

LINKED USER ACCOUNTS

TECHNICAL FIELD

The present technology pertains to user accounts, and more specifically pertains to linking user accounts.

BACKGROUND

Online stores allow users to purchase any variety of items from the comfort of their computing device. For example, online media stores allow users to purchase a variety of electronic content items such as music, movies, books, etc., which a user can access from their computing device. While users can easily purchase these items online, sharing these items with family members can be difficult. Oftentimes accessing the purchased content items is restricted to the user account that purchased the content item.

To alleviate this problem, many families share a single user account to make content item purchases. While sharing a single user account allows multiple family members to access purchased content items, this technique also provides several problems. For example, by sharing a single user account, purchases made by each family member affects the user profile associated with the user account. Thus, a father that allows his children to purchase songs on his user account may receive recommendations based on the purchases made by the children because the father's user profile is polluted with purchases made by other family members.

Another problem with sharing a single user account is that the purchased content items are associated with the user account used to purchase the content item and cannot be transferred to another user account. This can problematic when a family member wants to create a separate user account. For example, a child leaving for college may wish to have their own user account, separate from the user account shared with the child's father. The child has no way to transfer the child's content items purchased with the father's user account. Accordingly, there is a need for an improved method of sharing purchased content items between family members.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, devices, and non-transitory computer-readable storage media for linking multiple user accounts. Separate users, such as family members, can select to link their individual user accounts together into a group so that content items purchased by each linked member of the family can be viewed by the other linked members of the family. For example, content items such as movies, music, etc., purchased using a father's user account can be accessed by the mother, daughter and son, from their respective user account, when the user accounts of each of the individual family members is linked together.

Linking user accounts together allows content items to be shared across the various user accounts while still retaining the properties of the individual user accounts and associated user profiles. For example, each user account can retain a unique username and password, allowing each user to manage access to their individual user account. Further, purchase and preference data gathered will be associated with the individual user account, rather than a single shared user account. This can result in more accurate targeting of content item recommendations and advertisements to each individual user.

Further, linking user accounts allows a user to retain their purchased content items if and when the user decides to unlink their user account. For example, a son going off to college can choose to unlink his user account from his father's user account, and the content items purchased using the son's user account will remain associated with the son's user account. The son will thus retain all of his content items when he unlinks his account. Further, after unlinking the two accounts, the father will no longer be able to access to the content items purchased using the son's user account and vice versa.

In some embodiments, the individual users can set account preferences that dictate how the linked user accounts interact with each other. For example, in some embodiments, a user can select which content items purchased by the user can be viewed by the linked user accounts. Alternatively, a user can select which content items associated with linked user accounts are presented to the user. For example, a father that shares similar movie taste with his son, but not similar taste in music, can select to have movies purchased by his son be displayed on the father's user account, and have music purchased by his son filtered out. As another example, a son may choose to not be presented with any content items purchased by his sister.

In some embodiments, linking user accounts can be restricted according to linking rules. For example, the linking rules can dictate a limit on the number of groups of linked user accounts a user account can be a part of, the number of user accounts that can be included in a group of linked user accounts, the number of client devices that can be authorized to access a linked user account, when a user account can be added or removed from a user account, etc.

In some embodiments, the linking rules can dictate how the linked user accounts make purchases. For example, the linking rules can dictate that each user account included in a group of linked user accounts must make purchases using the same payment method, such as a single credit card or bank account.

In some embodiments, a group of linked user accounts can include a master user account. The master user account can have increased functionality such as being able to set the payment method for the group of linked user accounts, authorize a user account to join the group, etc. Further, in some embodiments, the master user account can place restrictions of the other user accounts included in the group. For example, the master user account can restrict the types of content items that can be purchased or viewed by a user account, place a limit on the amount of money that can be spent by a user account, authorize a recurring budget or allowance for user account, etc.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 2A, 2B, and 2C illustrate an exemplary embodiment of linking multiple user accounts together;

FIGS. 3A, 3B, and 3C illustrate user accounts linked into a group of linked user accounts;

FIG. 4 illustrates an exemplary method embodiment of adding a user account to a group of linked user accounts;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for linking multiple user accounts. Separate users, such as family members, can select to link their individual user accounts together into a group so that content items purchased by each linked member of the family can be viewed by the other linked members of the family. For example, content items such as movies, music, etc., purchased using a father's user account can be accessed by the mother, daughter and son, from their respective user account, when the user account of each of the individual family members is linked together.

Linking user accounts together allows content items to be shared across the various user accounts while still retaining the properties of the individual user accounts. For example, each user account can retain a unique username and password, allowing each user to manage access to their individual user account. Further, purchase and preference data gathered will be associated with the individual user account, rather than a single shared user account. This can result in more accurate targeting of content item recommendations and advertisements to each individual user.

Further, linking user accounts allows a user to retain their purchased content items if and when the user decides to unlink their user account. For example, a son going off to college can choose to unlink his user account from his father's user account, and the content items purchased using the son's user account will remain associated with the son's user account. The son will thus retain all of his content items when he unlinks his account. Further, after unlinking the two accounts, the father will no longer be able to access to the content items purchased using the son's user account and vice versa.

Figure 1:
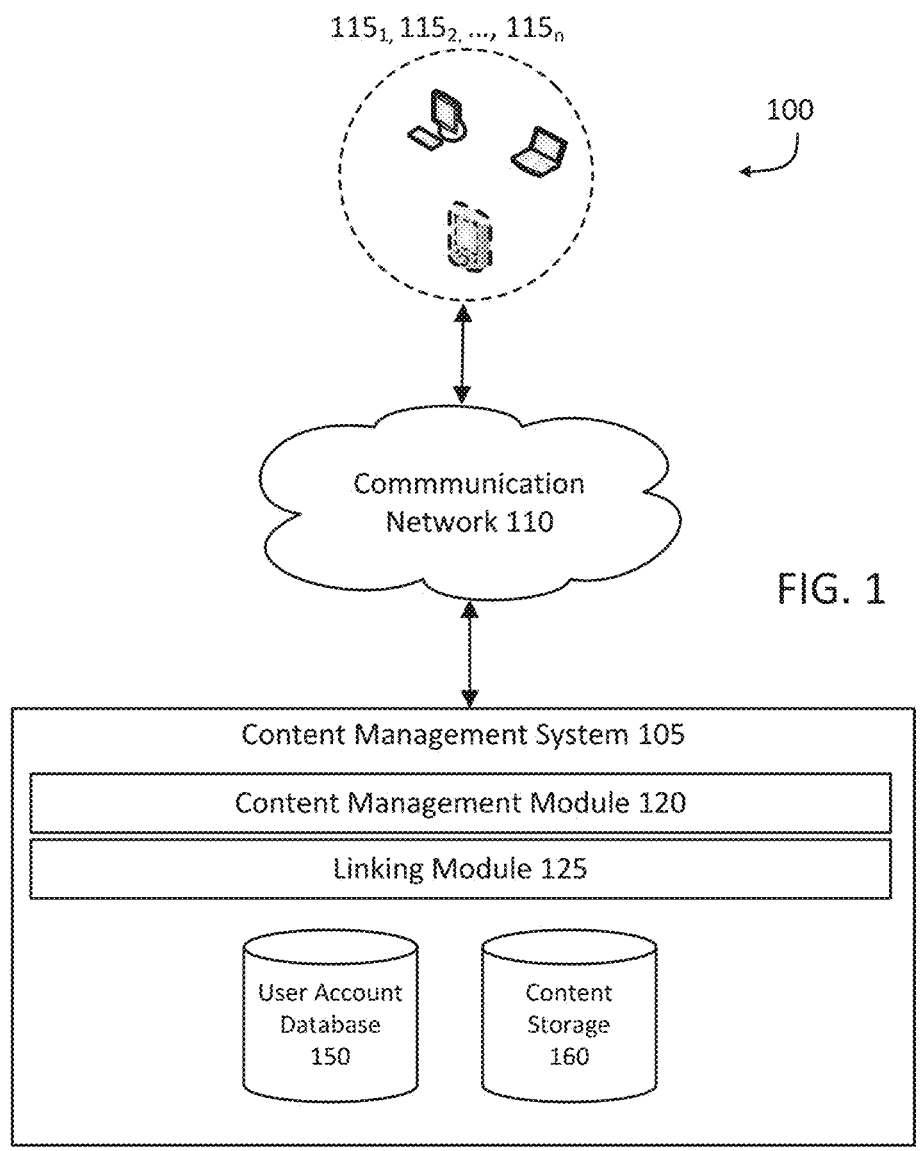
FIG. 1 illustrates an exemplary configuration of devices and a network in accordance with the invention.

FIG. 1 illustrates an exemplary system configuration 100, wherein electronic devices communicate via a network for purposes of exchanging content and other data. As illustrated, multiple computing devices can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communications links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device of FIGS. 7A and 7B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, a user can interact with content management system 105 through client devices $115_1$, $115_2$, ..., $115_n$ (collectively "115") connected to communication network 110 by direct and/or indirect communication. Content management system 105 can support connections from a variety of different client devices, such as desktop computers; mobile computers; mobile communications devices, e.g. mobile phones, smart phones, tablets; smart televisions; set-top boxes; and/or any other network enabled computing devices. Client devices 115 can be of varying type, capabilities, operating systems, etc. Furthermore, content management system 105 can concurrently accept connections from and interact with multiple client devices 115.

A user can interact with content management system 105 via a client-side application installed on client device $115_i$. In some embodiments, the client-side application can include a content management system specific component. For example, the component can be a stand-alone application, one or more application plug-ins, and/or a browser extension. However, the user can also interact with content management system 105 via a third-party application, such as a web browser, that resides on client device $115_i$ and is configured to communicate with content management system 105. In either case, the client-side application can present a user interface (UI) for the user to interact with content management system 105. For example, the user can interact with the content management system 105 via a client-side application integrated with the file system or via a webpage displayed using a web browser application.

Content management system 105 can be configured to manage content items for multiple user accounts. For example, content management system 105 can allow users to purchase, store and access content items. Furthermore, content management system 105 can make it possible for a user to access the content items from multiple client devices 115. Accessing a content item can include receiving metadata describing the content item, streaming the content item from content management system 105 or downloading the content item.

To facilitate the various content management services, a user can create a user account with content management system 105. The account information for each created user account can be maintained in user account database 150. User account database 150 can store profile information for each user account, including a unique account identifier identifying the user account, personal information, username, password, email address, address, credit card information, banking information, etc. User account database 150 can also include account management information, such as content storage locations, security settings, personal configuration settings, client devices authorized to access the user account, etc.

A user account can be used to purchase, manage and store content items, such as digital data, documents, text files, audio files, video files, etc. In some embodiments, a content item can be an item that is subject to a licensing restriction. For example, content management system 105 can provide an online content store where users can purchase a variety of content items. Further, in some embodiments, a user can upload content items from one of client devices 115 to content management system 105. The purchased and uploaded content items can be assigned to the user's user account and then accessed by the user from any of client devices 115. For example, a content item identifier identifying each content item assigned to a user account can be stored in user account database 150 and associated with the corresponding user account. The content item identifier can be used to identify the content item as well as the location of the content item.

The content items can be stored in content storage 160. Content storage 160 can be a storage device, multiple storage devices, or a server. Alternatively, content storage 160 can be a cloud storage provider or network storage accessible via one or more communications networks. Content management system 105 can hide the complexity and details from client devices 115 so that client devices 115 do not need to know exactly where the content items are being stored by content management system 105. Content management system 105 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various user accounts. The metadata for a content item can be stored as part of the content item or can be stored separately. In one variation, each content item stored in content storage 160 can be assigned a system-wide unique identifier.

Content management system 105 can include content management module 120 configured to manage and access each user account and the content items assigned to the user accounts. For example, content management module 120 can be configured to communicate with user account database 150 and content storage 160 to adjust privileges with respect to content items and otherwise manage content items.

Upon a user logging into their user account from one of client devices 115, content management module 120 can access the account information associated with the user account to identify the content items assigned to the user account, as well as account configuration data dictating presentation of the content items. Content management module 120 can then present and/or provide the content items to the user according to the account configuration data. For example, content management module 120 can access a user account to identify the content item identifiers assigned to the user account. The content item identifier can then be used to identify and locate the content items assigned to the user account, which can be presented according to the account configuration data.

Presenting the content items can include transmitting metadata describing the content items to client device $115_j$ which was used to access the user account. Client device $115_j$ can then use the received metadata to present the content items that the user account can access. For example, client device $115_j$ can present information identifying the content items in a content item library available to the user account. This can include presenting the title of the content item, an image such as an album or book cover, description, etc.

Content management module 120 can also assign content items to a user account. For example, upon a user purchasing or uploading a content item, content management module 120 can add a content item identifier identifying the purchased content item to the user account in account database 150, thus giving the user account access to the content item.

In some embodiments, content management system 105 can be configured to link multiple user accounts together so that content items assigned to each of the individual user accounts can be accessed by each of the linked user accounts. This can allow family members to link their user accounts together to share their content items with each other, while maintaining their personal user account.

To link user accounts together, content management system 105 can include linking module 125. In some embodiments, linking module 125 can be configured to provide an account link interface that enables a user to link their user account to other user accounts. For example, the account link interface can enable a user to request that their user account be linked to another user account and/or accept a request received from another user account. Upon logging into their user account, a user can use the account link interface to link their user account to the user account of other users.

To link multiple user account together, linking module 125 can be configured to modify the account information of the linked user accounts to indicate that the user accounts are linked together. For example, in some embodiments, linking module 125 can modify a user account to include the unique account identifier of each user account linked to the user account. Account management module 120 can then access a user account to identify each of the user accounts linked to the user account. Likewise, to unlink a user account, linking module 125 can modify the user account of each linked user account to remove the unique account identifier of the user accounts that are no longer linked.

FIGS. 2A-2C illustrate an exemplary embodiment of linking multiple user accounts together. FIG. 2A, illustrates three user accounts: user account 205, user account 210 and user account 215. As shown, each user account (205, 210, 215) includes a unique account identifier field, a content item identifier field and a linked account field.

The unique account identifier field can include a unique account identifier that uniquely identifies a user account. As shown, the unique account identifier for user account 205 is 1; the unique account identifier for user account 210 is 2; and the unique account identifier for user account 215 is 3.

The content item identifier field can include content item identifiers identifying each content item assigned to the individual user account. As shown, content items 11 and 12 are assigned to user account 205, content item 13 is assigned to user account 210, and content items 14, 15 and 16 are assigned to user account 215.

The linked account field can identify the user accounts linked to a user account. For example, the linked account field can include the unique account identifier of each user account linked to the user account. As shown, none of the three user accounts (205, 210, 215) has a unique identifier in their respective linked account field, indicating that none of the user accounts (205, 210, 215) are linked to another user account. Each of the user accounts (205, 210, 215) can therefore access only the content items assigned to their respective user account. Thus user account 205 can access only content items 11 and 12, user account 210 can access only content item 13, and user account 215 can access only content items 14, 15 and 16.

FIG. 2B illustrates user accounts 205, 210 and 215 after they have been linked together to form a group of linked user accounts. As shown, user account 205 includes unique account identifiers 2 and 3 in the linked account field. This indicates that user account 205 is now linked to user accounts 210 and 215. Likewise, user account 210 includes the unique account identifiers 1 and 3 in its linked account field indicating that user account 210 is linked to user accounts 205 and 215, and user account 215 includes unique account identifiers 1 and 2 in its linked account field, indicating that user account 215 is linked to user accounts 205 and 210.

As a result of the user accounts 205, 210 and 215 being linked together, each of the user accounts (205, 210, 215) can access the content items assigned to the other user accounts, in addition to the content items assigned to the individual user account. For example, user account 205 can access content item 13 assigned to user account 210, and content items 14, 15 and 16 assigned to user account 215, in addition to the content items 11 and 12 assigned to user account 205. Likewise, user account 210 can access content items 11, 12, 14 15 and 16 in addition to the content items assigned to user account 210, and user account 215 can access content items 11, 12 and 13, in addition to the content items assigned to user account 215.

FIG. 2C illustrates user accounts 205, 210 and 215 after user account 205 has been removed from the group of linked user accounts. As shown, user account 205 no longer has any unique account identifiers listed in the linked account fields. This can indicate that user account 205 is no longer linked to any other user account. Further, the linked account fields of user accounts 210 and 215 have also been modified to remove the unique account identifier of user account 205, indicating that user accounts 210 and 215 are no longer linked to user account 205.

While user account 205 has been unlinked from user accounts 210 and 215, user accounts 210 and 215 remain linked to each other, as indicated by the linked account field of user accounts 210 and 215. As a result, user account 205 can access only the content items assigned to user account 205, and can no longer access the content items assigned to user accounts 210 and 215. Likewise, user accounts 210 and 215 can no longer access the content items assigned to user account 205, however user accounts 210 and 215 can still access the content items assigned to the other account. Thus, user account 205 can only access content items 11 and 12, whereas user accounts 210 and 215 can each access content items 13, 14, 15 and 16, but not content items 11 and 12.

Although listing unique account identifiers in a user account is used as one example of how user accounts can be linked together, this is only one possible embodiment and is not meant to be limiting. Linking multiple user account together can be performed in any of numerous ways known in the art.

As an example, in some embodiments, a user account need on be linked to the master or administrator account, and subordinate accounts can learn the other members of the group from the master account. As another example, in some embodiments, a unique group identifier can be used to identify a group of linked user accounts to which a user account belongs. A unique group identifier can identify one group of linked user accounts. Each user account can include a listing of unique group identifiers that identify each group of linked user accounts that include the user account belongs. A group index can be used to identify the user accounts included in each group of linked user accounts. For example, the group index can list each unique group identifier along with the unique account identifier for each user account included in the group. To identifying the user accounts linked to a user account, the user account can be accessed to gather the group identifiers associated with the account. The group identifiers can then be used to search the group index to identify the user accounts included in each group.

Returning to FIG. 1, in some embodiments, linking module 125 can be configured to link user accounts according to a set of linking rules. The linking rules can be used to ensure that users are not linking their user accounts just to increase the number of content items each user has access to, but rather the linking is being used to link users to their family members, significant others, etc., with whom the user naturally shares content items. For example, in some embodiments, the linking rules can limit the number of groups of linked user accounts to which a user account can belong. For example, each user account can be limited to being included in only one group of linked user accounts. A group of linked user accounts can be a group of at least two user accounts that are each linked to each of the other user accounts included in the group. This concept is illustrated in FIGS. 3A-3C.

FIG. 3A shows two groups of linked user accounts (305, 310). Group 305 includes user accounts 1, 2 and 3, which are each linked to each other. Likewise, group 310 includes user accounts 4, 5, 6 and 7, which are each linked to each other. Thus user accounts 1, 2 and 3 can each access the content items assigned to the each user account in group 305 and user accounts 4, 5, 6 and 7 can each access the content items assigned to each user accounts in group 310. Further user account 8 is not included in group 305 or group 310. Thus user account 8 is not linked to any of the user accounts in group 305 or 310 and vice versa.

In an embodiment in which the linking rules dictate that a user account can only be included to one group of linked user accounts, the user accounts in group 305 (1, 2, 3) cannot be linked to a user account that is not included in group 305. Likewise the user accounts in group 310 (4, 5, 6 and 7) cannot be linked to a user account that is not included in group 310. Further, user account 8 cannot be linked to a user account in either of groups 305 or 310 without being linked to each of the user accounts in the respective group and vice versa.

FIG. 3B illustrates user account 8 joining a group. As shown, user account 8 is now included in group 310. As a result, user account 8 is now linked to each of the user accounts in group 310 and vice versa. Further, user account 8 cannot be linked to a user account that is not included in group 310 while user account 8 is included in group 310.

FIG. 3C illustrates user account 4 joining group 305. As shown, user account 4 is no longer included in group 310, meaning that user account 4 can no longer access the content items assigned to the user accounts included in group 310 (5, 6, 7, 8). Further, user account 4 is now included in group 305, meaning that user account 4 is now linked to each user account in group 305, and vice versa. User account 4 can thus access the content items assigned to each user account in group 305.

While this example illustrates a user account being limited to membership in one group of linked user accounts, this is only one example and is not meant to be limiting. The linking rules can dictate that a user account can be limited to any number of groups, or alternatively, without any limitation, and this disclosure envisions all such embodiments.

In some embodiments, the linking rules can limit the number of user accounts that can be included in a group. For example a group can be limited to 5, 10, 15, etc. user accounts. This can prevent a large number of users from linking their user accounts together to access the content items of the other members.

In some embodiments, the linking rules can dictate geographic limits for linking user accounts. For example, the linking rules can dictate that only users that live within a predetermined distance of each other can link their user accounts together. In some embodiments, the linking rules can dictate that only users that live in the same country can link their user accounts together. The location of the user accounts can be drawn from either profile data stored in the user account, or alternatively, gathered from client devices used by the user. For example, the location of a client device can be derived from an IP address associated with the client device, or alternatively, gathered from a GPS component of the client device.

In some embodiments, the linking rules can limit the number of client devices that can be included in a group of linked user accounts. For example, in some embodiments, a user account can only be accessed by a client device that is authorized to access the user account. Thus a user can access their user account from only the client devices that are authorized on their user account. In this type of embodiment, the linking rules can limit the number of client devices that can be authorized to the group of linked user accounts. For example, the linking rules can dictate that a group of linked user accounts can be limited to 20 authorized client devices.

Alternatively, the linking rules can dictate a limit on the number of client devices that can be authorized on each individual user account in the group of user accounts. For example, each user account included in the group of linked user accounts can be limited to only 5 authorized client devices. In this type of embodiments, the number of client devices that can be authorized to a group can be variable based on the number of client devices included in the group.

In some embodiments, the liking rules can dictate a period of time in which only a limited number of client devices can be authorized to the group, after which the number can be increased or the limitation can be removed altogether. For example, the linking rules can dictate that a user account can only be accessed by a maximum of five authorized user accounts for the first year after the group is created and/or a user account is added to a group, but after the one year, the restriction is removed. The user account can therefore be accessed by any number of client devices after the one year mark has passed.

In some embodiments, the linking rules can limit when a user account can be removed from a group of linked user accounts. For example the linking rules can dictate that a user account cannot be removed from a group of linked user accounts for a predetermined amount of time after the user account is added to the group and/or the group is created. For example the linking rules can dictate that a user account must remain within a group for at least 90 days after joining the group and/or the group is created.

Alternatively, in some embodiments, the linking rules can limit when a user account can be added to a group. For example, the linking rules can dictate that a user account cannot be added to a group within a predetermined amount time after the user account has been removed from a group. For example, the linking rules can dictate that a user account cannot be added to a group within one year after being removed from a group. Alternatively, the linking rules can dictate that a user account cannot be added to a group within a predetermined amount to time after being added to a group, e.g., one year from being added to the group.

In some embodiments, the linking rules can dictate that each user account linked in a group must make purchases using a single payment method, such as with the same credit card or bank account. Thus, a family that has their user accounts linked together in a group must make their purchased using a single credit card.

In some embodiments, one of the user accounts in a group of linked user accounts can be designated as a master user account, which can have additional functionality. For example, in some embodiments, the master user account can be the only user account capable of changing the payment method that must be used by the group. As another example, the master user account can be the user account in the group enabled to add a user account to the group and/or select to remove a user account from the group.

In some embodiments, the master user account can be enabled to set restrictions on the other user accounts include in the group. For example, the master user account can restrict the content items that can be viewed and or purchased by members of the group. A mother can then choose to restrict the types of movies, music, books, etc., that her children can access. For example, a mother can restrict her children from purchasing or accessing movies of a certain maturity rating such as PG-13, R, etc. Alternatively, a mother can restrict her children from purchasing or accessing songs with explicit lyrics.

In some embodiments, the master user account can be enabled to restrict the number of purchases and/or the amount of funds available to the user accounts in the group. For example, a mother can limit her son's user account to $20 in purchases. In some embodiments, the master account can set a recurring budget for the user accounts in the group. For example, a mother can allocate $20/month to her son's user account.

In some embodiments, the master user account can require that requested purchases made by a user account in the group be authorized by the master user account. For example, a mother can require that each purchase that a son would like to make must be approved by the mother prior to the transaction being completed. In this type of embodiment, an authorization request can be transmitted to at least one of the client devices authorized on the master user account upon a purchase being requested using the restricted user account. The authorization request can include data identifying the content item that the user would like to purchase. Upon approval of the authorization request, the requested purchase can be completed. Alternatively, if the requested purchase is denied, the purchase is canceled.

In some embodiments, the user account used to create a group of linked user accounts can be designated the master user account. Alternatively, a user account can be designated as the master user account after the group of user accounts has been created; for example, after receiving authorization from the members of the group of linked user accounts that the user account should be the master user account.

In some embodiments, the user account that provides the payment method used to make purchases for the group can be designated the master user account. Alternatively, the user account designated the master user account can be required to provide a valid payment method.

In some embodiments, the master user account can be enabled to designate another user account to be the master user account. This can be useful when the master user account leaves the group of linked user accounts. Alternatively, the members of the group of user accounts can be prompted authorize one of the user accounts remaining in the group as the new master user account upon the master user account leaving the group.

In some embodiments, whether and how a content item can be accessed by other members of the group of linked user accounts can vary based on the type of content item. For example, some content items can be considered consumable content items because they can be exhausted, and thus have limited availability. For example, an in-application purchase such as extra lives for a game can be considered a consumable content item because after the purchased lives are used, the content item is exhausted. In some embodiments, consumable content items can be accessed by only the user account that purchased the consumable content item. Thus a son who purchases more lives to use for his game doesn't have to worry about his brother using the purchased lives.

Alternatively, in some embodiments, consumable content items can be shared with the group of linked user accounts. Thus, each user account could access the purchased lives to play the game from their respective user account.

In some embodiments, whether consumable content items are shared amongst the group can be dependent of settings for the group or the user account that purchased the consumable content item. For example, in some embodiments, the user account used to purchase the consumable content item can select whether the consumable content item should be shared with the other user accounts in the group or remain exclusive to the purchasing user account. Alternatively, the master user account can be allowed to set whether consumable content items are shared or remain exclusive to the purchasing user account.

In contrast, non-consumable content items that cannot be exhausted can generally be shared amongst the group. This can include content items such music, video, games, magazines, etc. Further, this can include in-application purchases that cannot be exhausted, such as magazine subscriptions, new game levels, non-exhaustible game power-ups, etc. Although non-consumable content items are generally shared, the linked user accounts can be configured to share content items in any of a number of ways and this disclosure appreciates all such possibilities.

FIG. 4 illustrates an exemplary method embodiment of adding a user account to a group of linked user accounts. Although specific steps are show in FIG. 4, in other embodiments a method can have more or less steps. As shown, the method begins at block 405 where a request to add a user account to a group of user accounts is received.

At block 410 it is determined whether the user account is already included in a different group of linked user accounts. If at block 410 it is determined that the user account is included in a different group of linked user accounts, the method continues to block 430 where the request to add the user account to the group is denied and the method ends.

If at block 410 it is determined that the user account is not included in a different group of linked user accounts, the method continues to block 415 where it is determined if a predetermined amount of time has elapsed since the last time the user account was added to a group of linked user accounts. For example, as a general rule, a user account may be allowed to join only one group within a year. Thus, at block 415 it can be determined whether the user account has been added to a group within the last year.

If at block 415 it is determined that the predetermined amount of time has not elapsed since the user account having been added to a group, the method continues to block 430 where the request to add the user account to the group is denied and the method ends. However, if at block 415 it is determined that the predetermined amount of time has elapsed, the method continues to block 420 where it is determined whether the group of linked user accounts includes a predetermined number of user accounts. For example, as a general rule, each group of user accounts can be limited to including up to ten user accounts. Thus, at block 420 it can be determined whether the group includes ten user accounts.

If at block 420 it is determined that the group includes the predetermined number of user accounts, the method continues to block 430 where the request to add the user account to the group is denied and the method ends. If at block 420 it is determined that the group does not include the predetermined number of user accounts, the method continues to block 425 where the user account is added to the group of user accounts. The method then ends.

Figure 5:
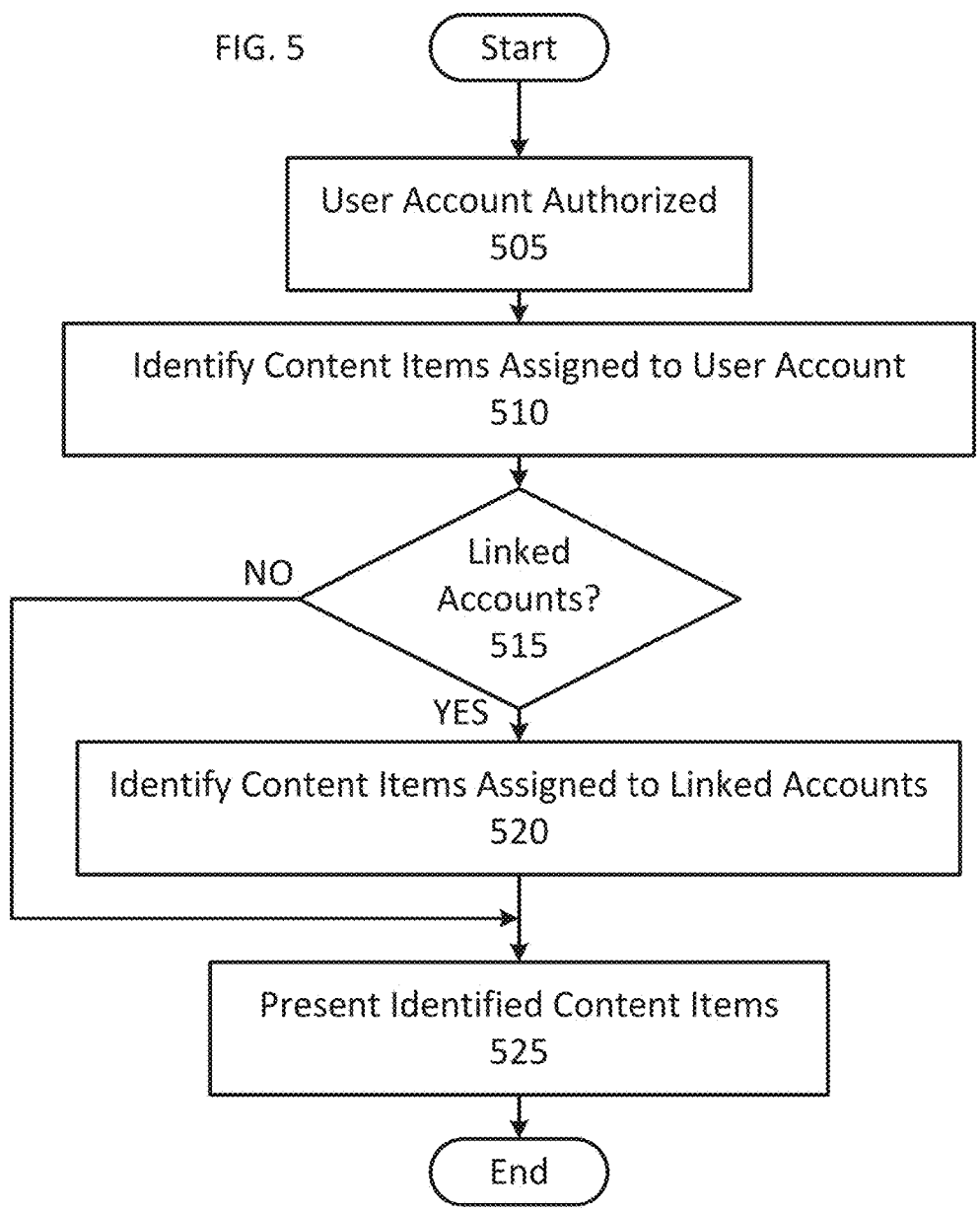
FIG. 5 illustrates an exemplary method embodiment of presenting content items.

FIG. 5 illustrates an exemplary method embodiment of presenting content items. Although specific steps are show in FIG. 5, in other embodiments a method can have more or less steps. As shown, the method begins at block 505 where access to a user account is authorized. This can be the result of a client device accessing a content management system and providing a correct user name and password associated with the user account. The client device can then be authorized to access the user account.

At block 510 content items assigned to the user account are identified. In some embodiments, the user account can include account data including content item identifiers that identify the content items assigned to the user account. The user account can thus be accessed to retrieve the content item identifiers and identify the content items assigned to the user account.

At block 515 it is determined whether the user account is linked to other user accounts. In some embodiments, the user account can include unique account identifiers identifying each user account linked to the user account. If the user account is not linked to other user accounts, the method continues to block 525 where the identified content items are presented. This can include transmitting data identifying the identified content items to the client device used to access the user account. The client device can then present the received data identifying the content items.

Alternatively, if at block 515 it is determined that the user account is linked to other user accounts, the method continues to block 520 where content items assigned to the user accounts linked to the user account are identified. This can be accomplished using the unique account identifiers identifying the linked user accounts to access the linked user accounts themselves and retrieve the content item identifiers assigned to the linked user accounts.

The method then continues to block 525 where the identified content items, including those assigned to the user account and those assigned to the user accounts linked to the user account, are presented. This can include transmitting data identifying the content items to the client device from which the user account was accessed. The data can then be presented on the client device. The method then ends.

Figure 6A:
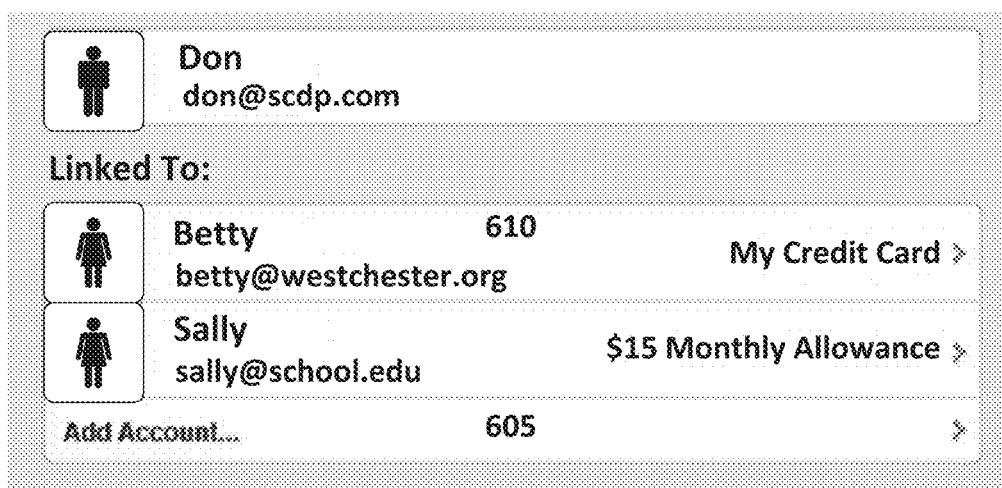
FIGS. 6A, 6B and 6C illustrate exemplary screen shots of a linking interface.
Figure 6B:
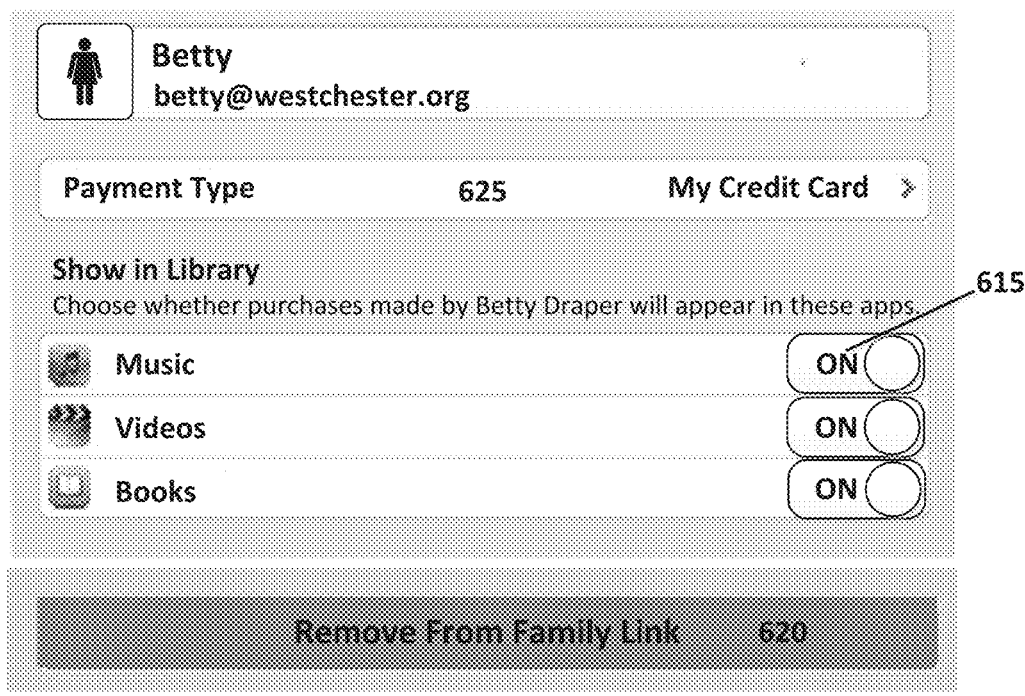
Figure 6C:
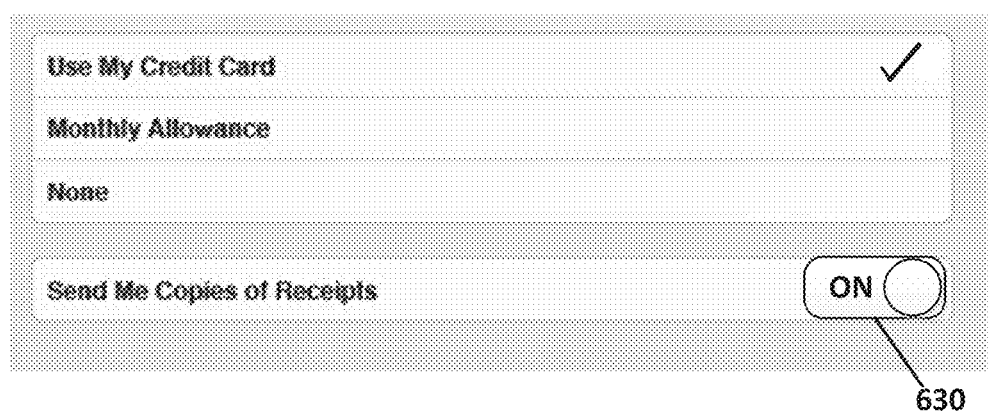

FIGS. 6A-6C illustrate exemplary screenshots of a linking interface. FIG. 6A shows the linking interface presented when logged into Don's user account. The linking interface lists that Don's user account is linked to the user accounts of Betty and Sally.

Further, the linking interface presents the payment method each of the linked user accounts is authorized to use for purchasing content items. As shown, Betty is authorized to make purchases using "my credit card," which can be Don's credit card. Sally, in contrast, is authorized to make purchases using a recurring $15 monthly allowance.

In this embodiment, Don's user account can be designated as the master user account enabling Don to vary settings affecting the group of linked user accounts. For example, the master user account can be enabled to add other user accounts to the group of user accounts. As shown, user interface element 605 labeled "add account" can enable Don to add a user account. Selection of user interface element 605 can enable Don to enter account information for other user accounts to add to the group.

Further, the master user account can vary settings regarding each of the linked user accounts, such as vary the payment method used by each of the linked user accounts to make purchases. To vary account settings in regards to Betty's user account, Don can select user interface element 610.

FIG. 6B illustrates a second view of the linking interface presented upon selection of user interface element 610. From this view, Don can vary settings in regards to Betty's user account. For example, Don can configure which content items assigned to Betty's user account are presented on Don's account. As shown, music, video and books assigned to Betty's user account are currently set to be presented on Don's user account. To filter out certain types of content items assigned to Betty's user account, Don can change the settings as shown. For example, Don can select user interface element 615 to toggle off music assigned to Betty's user account. When user interface element 615 is toggled off, Don will not be presented with music assigned to Betty's user account.

The linking interface further includes user interface element 620 configured to remove Betty's user account from the group. Don can choose to select user interface element 615 to remove Betty's user account from the group, resulting in content items assigned to Betty's account no longer being accessible by Don's user account, and vice versa.

To vary the payment method that Betty's user account is authorized to use to make purchases, Don can select user interface element 625. FIG. 6C illustrates a third view of the linking interface that is presented upon selection of user interface element 625. As show, Sally's user account is currently authorized to user "my credit card," however Don can select to limit Sally's user account to a monthly allowance or, alternatively, to remove authorization to make purchases.

Further, the linking interface can include user interface element 630 enabling Don to select whether receipts for purchases made using Betty's user account are sent to Don, for example via e-mail.

Figure 7A:
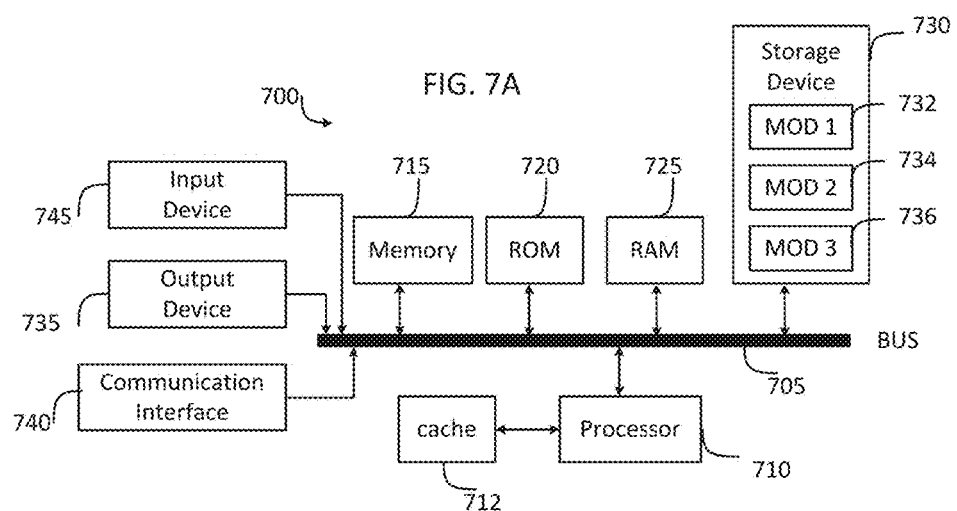
FIGS. 7A and 7B illustrate exemplary possible system embodiments.
Figure 7B:
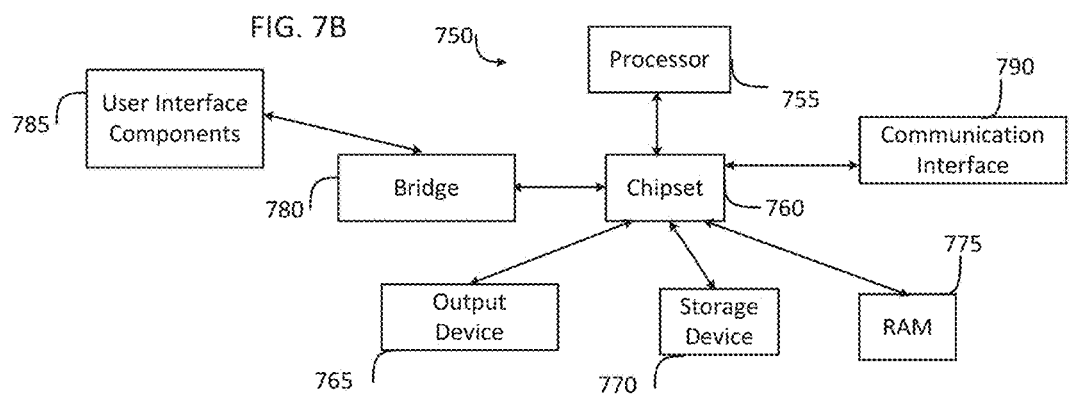

FIG. 7A, and FIG. 7B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output device 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   linking, using a computing device including a processor communicating with a database, a first user account, defining relationships to content items maintained in the database for a first user, with a second user account defining relationships to the content items maintained in the database for a second user, the second user account defining a particular relationship to a particular content item that was obtained using the second user account and thereby assigned to the second user account;
   after the first user account is linked to the second user account, providing access to the particular content item assigned to the second user account using the first user account, wherein the particular content item is not assigned to the first user account, and wherein access includes streaming or downloading the particular content item.

2. The method of claim 1, further comprising:
   assigning, to the first user account, a content item purchased using the first user account, wherein the second user account can access the content item purchased using the first user account but the content item purchased using the first user account is not assigned to the second user account.

3. The method of claim 1, further comprising:
   unlinking the first user account from the second user account, wherein, when the first user account is unlinked from the second user account:

content items assigned to the first user account remain assigned to the first user account, content items assigned to the second user account remain assigned to the second user account;

the first user account cannot access content items assigned to the second user account that are not assigned to the first user account including content items locally stored on a client device associated with the first user account, and the second user account cannot access content items assigned to the first user account that are not assigned to the second user account including, content items locally stored on a client device associated with the second user account.

4. The method of claim 3, further comprising:

receiving a request to unlink the first user account from the second user account; and determining that a predetermined amount of time has elapsed after the first user account was linked to the second user account, wherein the request to unlink the first user account from the second user account is denied when the predetermined amount of time has not elapsed.

5. The method of claim 1, further comprising:

receiving a request to link a third user account to the first user account and the second user account;

determining whether the third user account is linked to a fourth user account, the fourth user account being different than the first user account and the second user account, and the fourth user account not being linked to the first user account and the second user account; and when the third user account is linked to the fourth user account, denying the request to link the third user account to the first user account and the second user account.

6. The method of claim 1, wherein the first user account and the second user account are part of a group of linked user accounts in which each user account included in the group of linked user accounts is linked to each other user account included in the group of linked user accounts.

7. The method of claim 6, wherein, each user account included in the group of linked user accounts must make purchases using the same payment method.

8. The method of claim 6, further comprising:

receiving a request to add a third user account to the group of linked user accounts;

determining whether a total number of user accounts included in the group of linked user accounts is less than a predetermined limit;

when the number of user accounts included in the group of linked user accounts is not less than the predetermined limit, denying the request to add the third user account to the group of linked user accounts.

9. The method of claim 1, wherein the content item that was purchased by the second user account was purchased prior to the linking of the first user account with the second user account.

10. The method of claim 1, wherein providing the particular content item using the first user account does not modify profile data corresponding to the first user account.

11. A system comprising:

a database including content items;

a processor; and a memory containing instructions that, when executed, cause the processor to:

link a first user account defining relationships to the content items for a first user with a second user account defining relationships to the content items maintained in the database for a second user, the second user account defining a particular relationship to a particular content item that was obtained using the second user account and thereby assigned to the second user account;

after the first user account is linked to the second user account, providing access to the particular content item assigned to the second user account using the first user account, wherein the particular content item is not assigned to the first user account, and wherein access includes streaming or downloading the particular content item.

12. The system of claim 11, wherein the first user account and the second user account are part of a first group of linked user accounts wherein each user account included in the first group of linked user accounts, includes a record of other user accounts that are part of the first group of linked user accounts within account profiles associated with the each respective user accounts, the account profiles associated with the each respective user accounts stored at a content management system.

13. The system of claim 12, wherein the instructions further cause the processor to:

receive a request to add a third user account to the first group of linked user accounts, wherein the third user account is not included in the first group of linked user accounts;

determine whether the third user account is included in a second group of linked user accounts, different than the first group of linked user accounts;

when the third user account is not included in a second group of linked user accounts, add the third user account to the first group of user accounts; and when the third user account is included in the second group of linked user accounts, deny the request to add the third user account to the first group of linked user accounts.

14. The system of claim 12, wherein the first user account is designated as a master user account of the first group of linked user accounts, the master user account being granted permission to set parameters affecting the first group of linked user accounts.

15. The system of claim 14, wherein the master user account can define the types of content items that can be accessed by a user account in the first group of linked user accounts.

16. The system of claim 14, wherein the master user account can specify an amount of money that a user account in the first group of linked user accounts can utilize to purchase content items.

17. The system of claim 14, wherein the master user account can specify that a recurring allocation of money be allocated to the second user account to purchase content items.

18. The system of claim 14, wherein the master user account can require that a user account in the first group of linked user accounts request permission from the master user account to purchase a content item.

19. The system of claim 18, wherein the instructions further cause the processor to:

receive a permission authorization from the first user account, the permission authorization authorizing a purchase requested by the second user account to purchase a content item; and completing the purchase requested by the second user account, wherein the content item is assigned to the second user account.

20. A non-transitory computer-readable medium containing instructions that, when executed by a computing device communicating with a database, cause the computing device to:
- link a first user account, defining relationships to content items maintained in the database for a first user, with a second user account defining relationships to the content items maintained in the database for a second user, the second user account defining a particular relationship to a particular content item that was obtained using the second user account and thereby assigned to the second user account;
- after the first user account is linked to the second user account, providing access to the particular content item assigned to the second user account using the first user account, wherein the particular content item is not assigned to the first user account, and wherein access includes streaming or downloading the particular content item.

21. The non-transitory computer-readable medium of claim 20, wherein the instructions further cause the computing device to:
- assign, to the first user account, a content item purchased using the first user account, wherein the second user account can access the content item purchased using the first user account but the content item purchased using the first user account is not assigned to the second user account.

22. The non-transitory computer-readable medium of claim 20, wherein the instructions further cause the computing device to:
- unlink the first user account from the second user account, wherein, when the first user account is unlinked from the second user account:
  - content items assigned to the first user account remain assigned to the first user account,
  - content items assigned to the second user account remain assigned to the second user account;
  - the first user account cannot access content items assigned to the second user account that are not assigned to the first user account, and
  - the second user account cannot access content items assigned to the first user account that are not assigned to the second user account.

23. The non-transitory computer-readable medium of claim 22, wherein the instructions further cause the computing device to:
- receive a request to unlink the first user account from the second user account; and
- determine that a predetermined amount of time has elapsed after the first user account was linked to the second user account, wherein the request to unlink the first user account from the second user account is denied when the predetermined amount of time has not elapsed.

24. The non-transitory computer-readable medium of claim 20, wherein the Instructions further cause the computing device to:
- receive a request to link a third user account to the first user account and the second user account;
- determine whether the third user account is linked to a fourth user account, the fourth user account being different than the first user account and the second user account, and the fourth user account not being linked to the first user account and the second user account;
- when the third user account is not linked to the fourth user account, link the third user account to the first user account and the second user account; and
- when the third user account is linked to the fourth user account, deny the request to link the third user account to the first user account and the second user account.

25. The non-transitory computer-readable medium of claim 20, wherein the first user account and the second user account are part of a group of linked user accounts in which each user account included in the group of linked user accounts is linked to each other user account included in the group of linked user accounts.

26. The non-transitory computer-readable medium of claim 25, wherein the instructions further cause the computing device to:
- receive a request to add a third user account to the group of linked user accounts;
- determine whether a total number of user accounts included in the group of linked user accounts is less than a predetermined limit;
- when the number of user accounts included in the group of linked user accounts is less than the predetermined limit, add the third user account to the group of linked user accounts; and
- when the number of user accounts included in the group of linked user accounts is not less than the predetermined limit, deny the request to add the third user account to the group of linked user accounts.

27. The non-transitory computer-readable medium of claim 20, wherein, the first user account can be accessed using first unique login credentials and the second user account can be accessed using second unique login credentials, wherein the first unique login credentials and the second unique login credentials are not the same.

* * * * *